(12) United States Patent
Garg

(10) Patent No.: US 11,521,525 B2
(45) Date of Patent: Dec. 6, 2022

(54) METHOD AND SYSTEM OF MOBILE PROJECTION SYSTEM FOR IMPLEMENTING VEHICLE WINDOW DISPLAYS

(71) Applicant: Gaurav Garg, Fremont, CA (US)

(72) Inventor: Gaurav Garg, Fremont, CA (US)

( * ) Notice: Subject to any disclaimer, the term of this patent is extended or adjusted under 35 U.S.C. 154(b) by 0 days.

(21) Appl. No.: 17/026,309

(22) Filed: Sep. 21, 2020

(65) Prior Publication Data

US 2021/0110743 A1  Apr. 15, 2021

Related U.S. Application Data

(63) Continuation-in-part of application No. 16/783,142, filed on Feb. 5, 2020, now abandoned, which is a continuation-in-part of application No. 15/935,054, filed on Mar. 25, 2018, now abandoned.

(60) Provisional application No. 62/475,927, filed on Mar. 24, 2017.

(51) Int. Cl.
| | |
|---|---|
| *G09F 21/04* | (2006.01) |
| *G03B 21/62* | (2014.01) |
| *G03B 21/14* | (2006.01) |
| *G09F 9/30* | (2006.01) |
| *B60R 11/02* | (2006.01) |
| *B60J 3/00* | (2006.01) |
| *B60R 11/00* | (2006.01) |

(52) U.S. Cl.
CPC .......... *G09F 21/04* (2013.01); *B60R 11/0229* (2013.01); *G03B 21/145* (2013.01); *G03B 21/62* (2013.01); *G09F 9/30* (2013.01); *B60J 3/00* (2013.01); *B60R 2011/0026* (2013.01); *B60R 2011/0049* (2013.01); *B60R 2011/0288* (2013.01)

(58) Field of Classification Search
None
See application file for complete search history.

(56) References Cited

U.S. PATENT DOCUMENTS

| | | | | |
|---|---|---|---|---|
| 8,284,487 | B1* | 10/2012 | Liu | G03B 21/62 |
| | | | | 359/449 |
| 9,451,245 | B1* | 9/2016 | Darling | G06T 7/74 |
| 9,922,583 | B1* | 3/2018 | Moe | G09F 19/18 |
| 2012/0299800 | A1* | 11/2012 | Seo | G09F 19/18 |
| | | | | 345/1.3 |
| 2013/0046594 | A1* | 2/2013 | Davidson | G06Q 30/02 |
| | | | | 705/14.4 |
| 2014/0340585 | A1* | 11/2014 | Heinzelmann | H04N 5/7416 |
| | | | | 348/744 |
| 2016/0257263 | A1* | 9/2016 | Seal | G03B 29/00 |
| 2018/0276800 | A1* | 9/2018 | Abbas | H04N 5/2251 |
| 2019/0077313 | A1* | 3/2019 | Kanaguchi | B60K 35/00 |
| 2019/0232786 | A1* | 8/2019 | Sasaki | B60K 37/06 |
| 2021/0110743 | A1* | 4/2021 | Garg | G09F 9/30 |
| 2021/0382379 | A1* | 12/2021 | Lachaumette | G03B 21/26 |

* cited by examiner

*Primary Examiner* — Ryan M Gray

(57) ABSTRACT

In one aspect, a method includes the step of A mobile projection system; the system comprising: a hermetically sealed base unit configured to be releasably attached to an automobile; a microprocessor configured to receive a plurality of projectable images from a remote server over a wireless network; and a remote server configured to store a plurality of selected images over a period of time; a projection means configured to project a selected image through a translucent lens.

10 Claims, 7 Drawing Sheets

METHOD AND SYSTEM OF MOBILE PROJECTION SYSTEM FOR IMPLEMENTING VEHICLE WINDOW DISPLAYS

CROSS-REFERENCE TO RELATED APPLICATIONS

This application claims priority to U.S. patent application Ser. No. 15/935,054, titled METHOD AND SYSTEM OF MOBILE PROJECTION SYSTEM FOR IMPLEMENTING VEHICLE WINDOW DISPLAYS and filed on 25 Mar. 2018. U.S. patent application Ser. No. 15/935,054 claims priority to U.S. provisional patent application No. 62/475,927, titled MOBILE PROJECTION SYSTEM and filed on 24 Mar. 2017. These patent applications are hereby incorporated by reference in their entirety.

BACKGROUND

1. Field

This application relates generally to mobile projection system for implementing vehicle window displays.

2. Related Art

Many vehicles are now used for ridesharing, food delivery, and transportation network companies. In these cases, the rear seating areas are often not used (e.g. between picking up rides in a ride-sharing service). Drivers can make additional money using their vehicles for advertising. Drivers can put physical advertisements on a vehicle. However, these physical advertisements are static and can be difficult/costly to change. Vehicles can be driven in areas where the content of the advertisements are not related to vehicle's current location. Additionally, some vehicle can use exterior digital advertisement displays. However, these can be stolen or damaged. Consequently, improvements to the vehicle digital advertisement displays are desired.

BRIEF SUMMARY OF THE INVENTION

In one aspect, a method includes the step of a mobile projection system; the system comprising: a hermetically sealed base unit configured to be releasably attached to an automobile; a microprocessor configured to receive a plurality of projectable images from a remote server over a wireless network; and a remote server configured to store a plurality of selected images over a period of time; a projection means configured to project a selected image through a translucent lens.

BRIEF DESCRIPTION OF THE DRAWINGS

The present application can be best understood by reference to the following description taken in conjunction with the accompanying figures, in which like parts may be referred to by like numerals.

Figure 1:
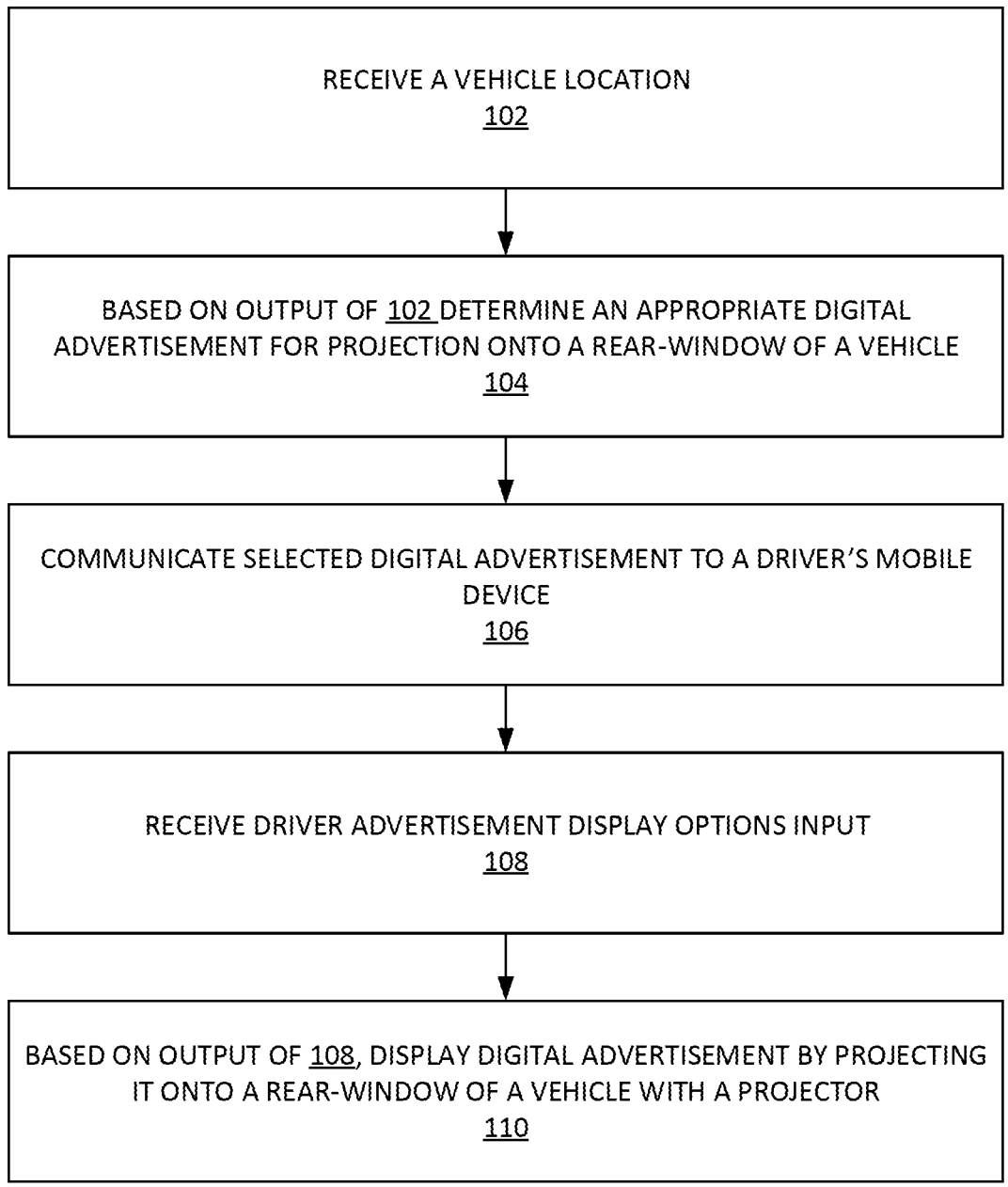
FIG. 1 depicts an example process for implementing a mobile image projection system for implementing vehicle window displays, according to some embodiments.

The Figures described above are a representative set and are not an exhaustive with respect to embodying the invention.

DESCRIPTION

Disclosed are a system, method, and article of mobile projection system for implementing vehicle window displays. The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments.

Reference throughout this specification to "one embodiment," "an embodiment," "one example," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Image projector is an optical device that projects an image (or moving images) onto a surface, such as a projection screen, etc.

Mobile device is a computing device small enough to hold and operate in the hand. In some examples, a mobile device can have an LCD flatscreen interface, providing a touch-screen interface with digital buttons and keyboard or physical buttons along with a physical keyboard. a mobile device can connect to the Internet and interconnect with other devices such as car entertainment systems or headsets via Wi-Fi, Bluetooth, cellular networks or near field communication (NFC). A mobile device can include integrated cameras, digital media players the ability to place and receive telephone calls, video games, and Global Positioning System (GPS) capabilities, etc.

Pico projector is a mobile image projector.

Polyvinyl chloride (PVC) is a synthetic plastic polymer.

Process Overview

FIG. 1 depicts an example process 100 for implementing a mobile image projection system for implementing vehicle window displays, according to some embodiments. In step 102 of process 100 can receive a vehicle location. For example, a driver's mobile device's GPS location can be determined as used a proxy for vehicle location. In step 104, process 100 can, based on output of step 102 can determine an appropriate digital advertisement for projection onto a rear-window of a vehicle. In step 106, process 100 can communicate selected digital advertisement to a driver's mobile device. In step 108, process 100 can receive driver advertisement display options input. In step 110, process 100 can based on output of 108, display digital advertisement by projecting it onto a rear-window of a vehicle with a projector (e.g. Pico projector, or other mobile image projection system).

Exemplary Environment and Architecture

In one example, a mobile projection system (e.g. Pico projector 206 infra) can be designed to be attached to the interior or exterior portions of a vehicle and projection selected images and advertisements over a wireless network and onto at least one window of a vehicle. The mobile projection system can be configured to display a plurality of logos, slogans, trademarks, and advertisement on the window portion of vehicle once transmitted from the server to the microprocessor affixed within the base unit. The system includes a housing have a translucent portion and projecting lens; a microprocessor, and projector. A base unit can be provided that is comprised of high durometer weather resistant plastic or thermoplastic casing which is hermetically sealed with both a translucent portion and a lens to prevent moisture intrusion an interior portion. However, any high durometer material or metal may be used as long as it provides a water barrier to the interior components and enables projection in a variety of weather conditions and settings.

The microprocessor can be configured to receive a selected image stored within a remote server over a wireless network. The microprocessor can be further pre-programmed to transmit a selected image to the projector where it may be displayed using a lens onto at least one window of a vehicle (e.g. an automobile, a truck, a boat, an airplane, etc.).

Figure 2:
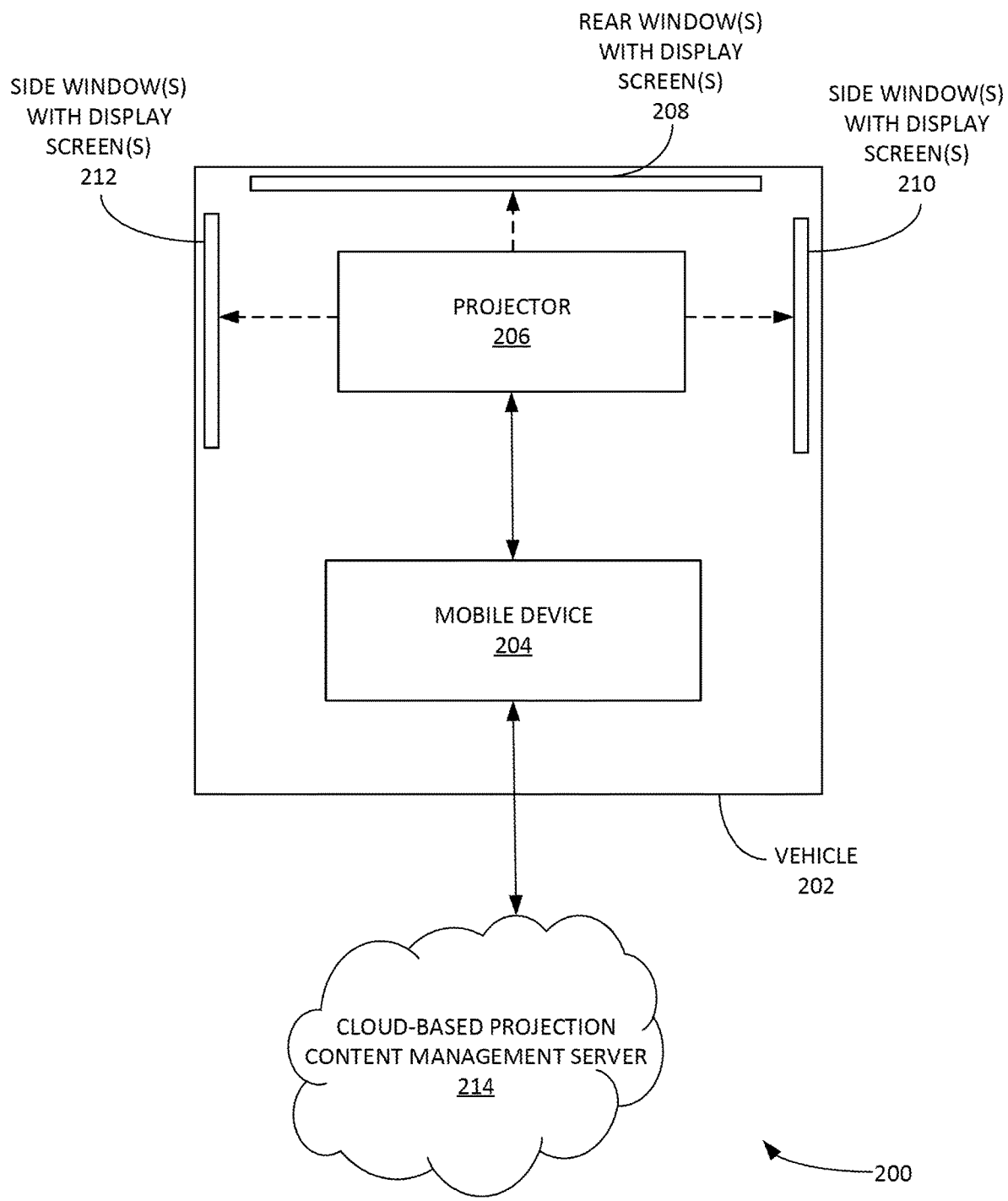
FIG. 2 is a block diagram of an example mobile projection system for implementing vehicle window displays, according to some embodiments.
Figure 5:
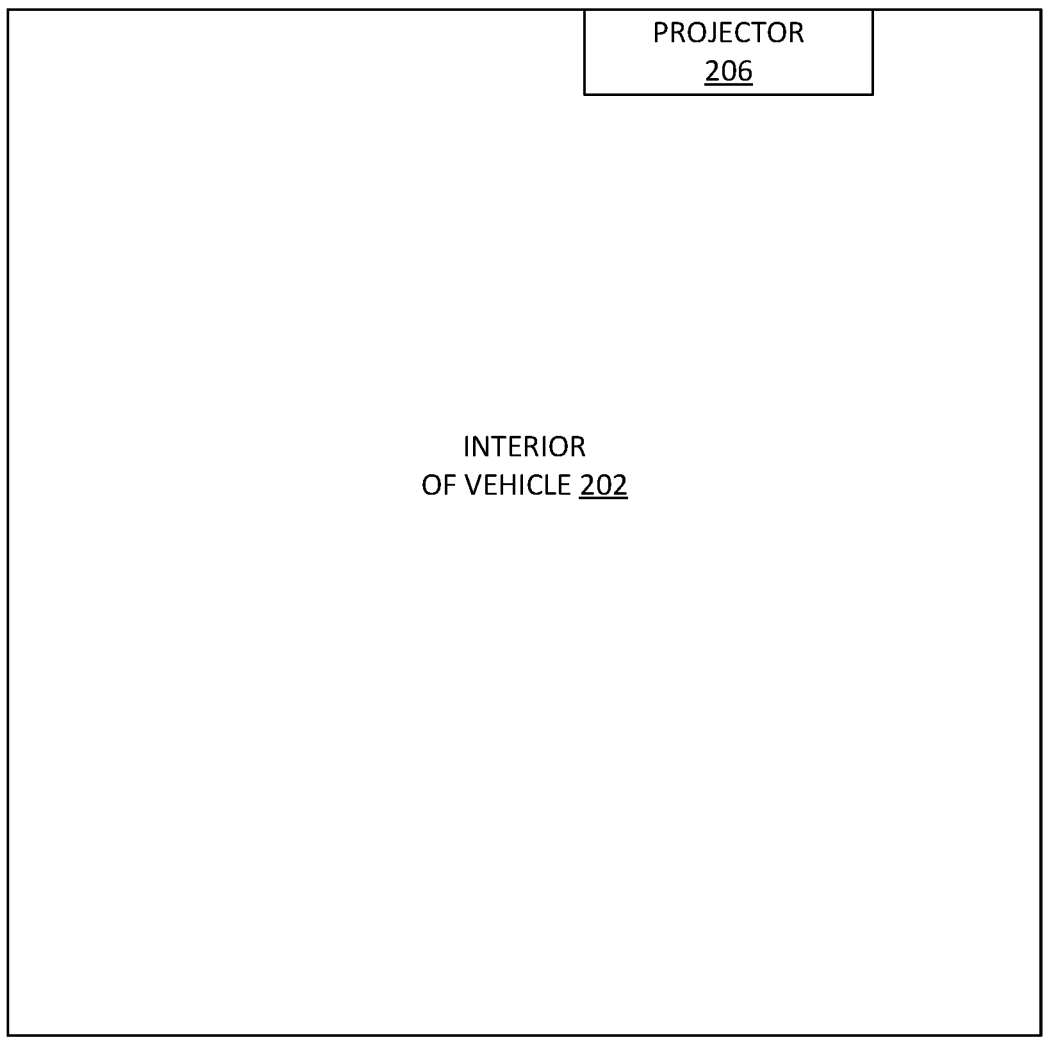
FIG. 5 illustrates an example of a projector placed in a rear-seating area of a vehicle, according to some embodiments.

Referring now to the drawings wherein like reference numerals designate identical or corresponding parts throughout the views. FIG. 2 is a block diagram of an example mobile projection system 200 for implementing vehicle window displays, according to some embodiments. Mobile projection system 200 can include a vehicle 202. Vehicle 202 can have a Pico projector 206 installed in the rear-seating area. Pico projector 206 can include one or more projection systems for projecting images onto screens on the rear-windows 208-212. The screens can be opaque, translucent and/or transparent depending on the screen material. FIG. 5 infra illustrates an example of a Pico projector 206 placed in a rear-seating area of a vehicle 202.

Figure 6:
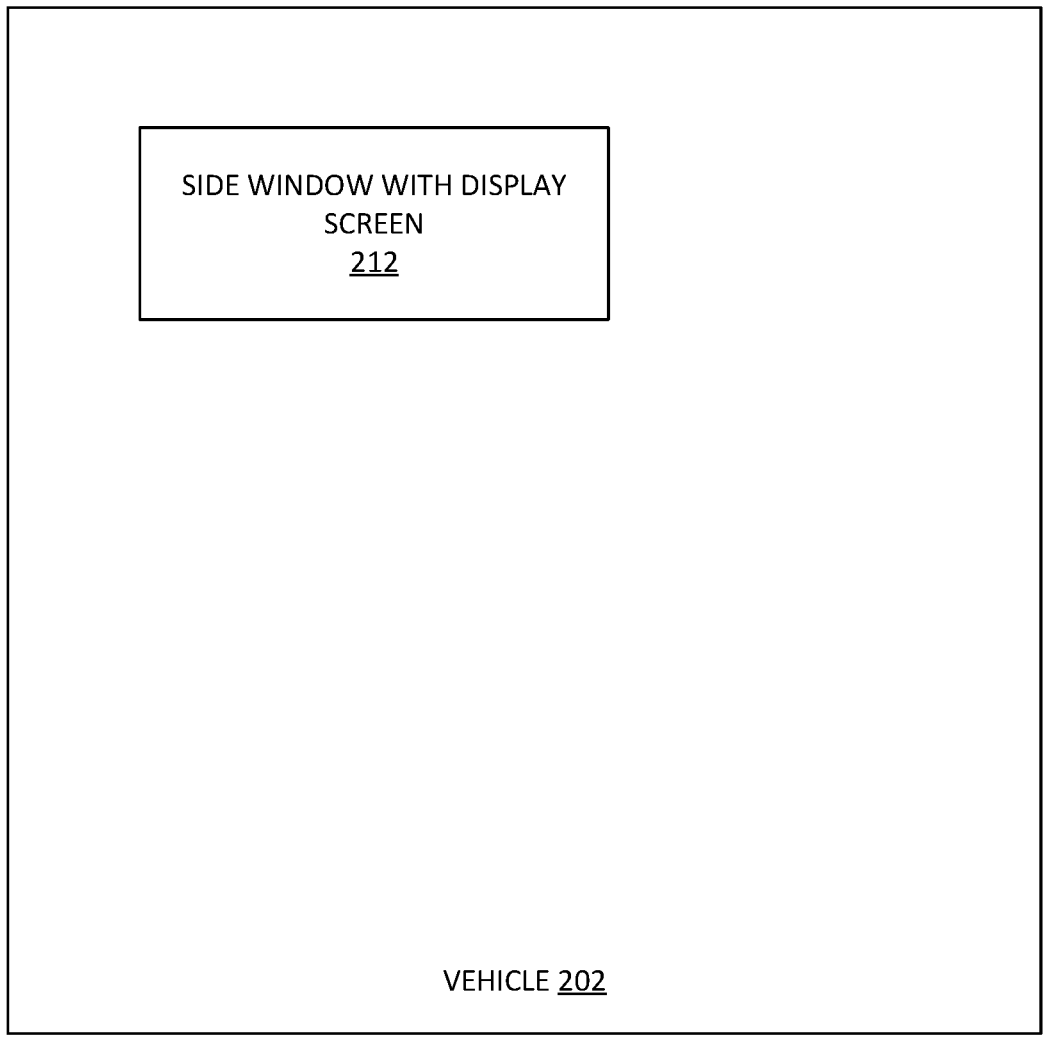
FIG. 6 illustrates an example of an image projected onto a screen placed on a rear-window of a vehicle, according to some embodiments.

Pico projector 206 can received digital advertisement content (and/or other digital content) for display on onto screens on the rear-windows 208-212. FIG. 6 infra illustrates an example of an image projected onto a screen placed on a rear-window of a vehicle 202. Pico projector 206 can wireless communicate with a nearby microprocessor with LTE network connectivity 204 (e.g. in a mobile device, etc.). Microprocessor with LTE network connectivity 204 can communicate with a remote server(s) (e.g. advertisement management server 708, etc.) to obtain digital advertisement content and/or other digital content) Microprocessor with LTE network connectivity 204 can include an application (e.g. application 702 infra, etc.) for managing display of digital advertisement content (and/or other digital content).

Figure 3:
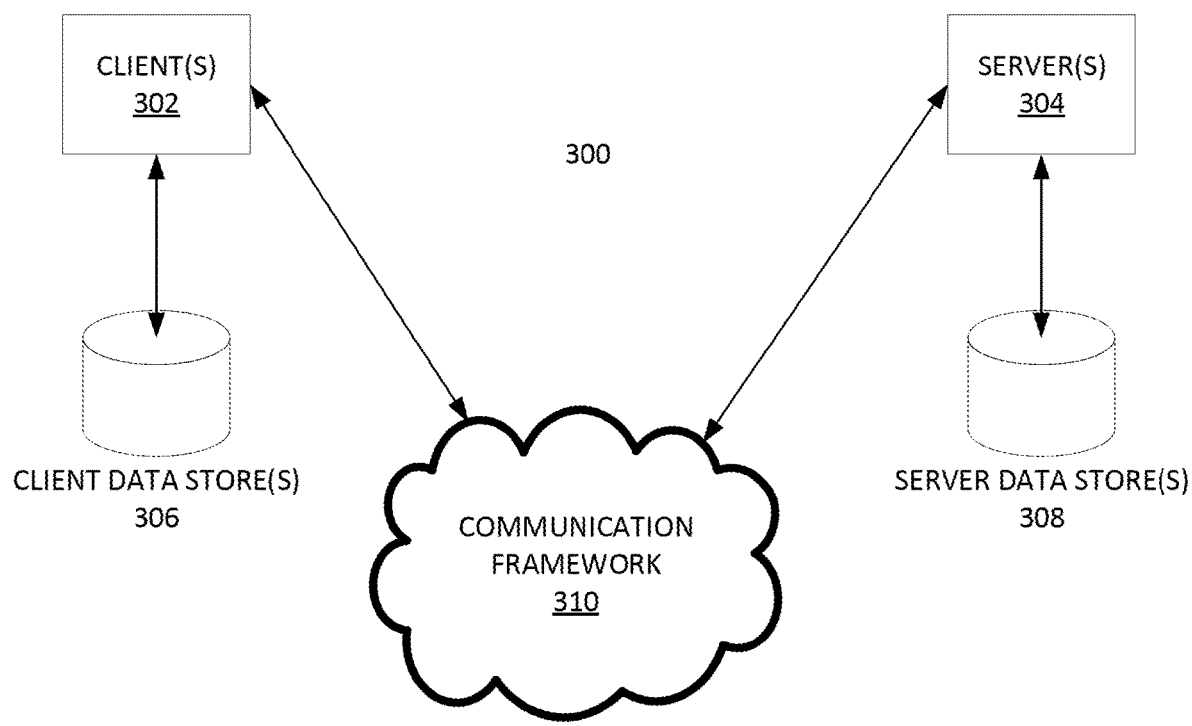
FIG. 3 is a block diagram of an example of a real-estate computing platform, according to some embodiments.

FIG. 3 is a block diagram of a sample computing environment 300 that can be utilized to implement some embodiments. The system 300 further illustrates a system that includes one or more client(s) 302. The client(s) 302 can be hardware and/or software (e.g., threads, processes, computing devices). The system 300 also includes one or more server(s) 304. The server(s) 304 can also be hardware and/or software (e.g., threads, processes, computing devices). One possible communication between a client 302 and a server 304 may be in the form of a data packet adapted to be transmitted between two or more computer processes. The system 300 includes a communication framework 310 that can be employed to facilitate communications between the client(s) 302 and the server(s) 304. The client(s) 302 are connected to one or more client data store(s) 306 that can be employed to store information local to the client(s) 302. Similarly the server(s) 304 are connected to one or more server data store(s) 308 that can be employed to store information local to the server(s) 304.

FIG. 3 is provided by way of example, in other embodiments, the methods and systems provided herein can be implemented in cloud-computing environments. For example, all or portions of system 300 can be implemented as a virtual machine(s) in a cloud-computing environment.

Figure 4:
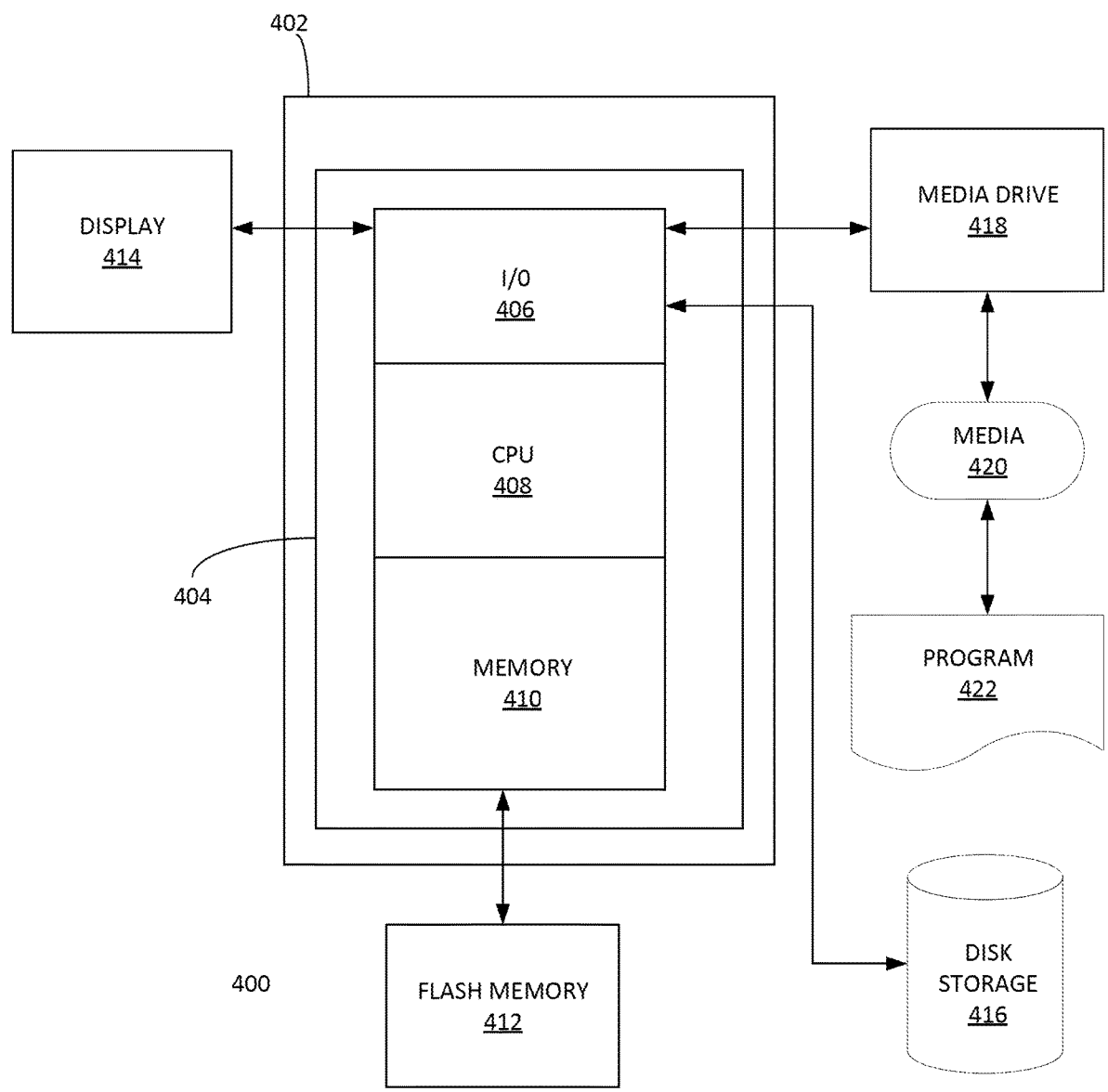
FIG. 4 is a block diagram of a sample computing environment that can be utilized to implement some embodiments.

FIG. 4 depicts an exemplary computing system 400 that can be configured to perform any one of the processes provided herein. In this context, computing system 400 may include, for example a processor, memory, storage, and I/O devices (e.g., monitor, keyboard, disk drive, Internet connection, etc.). However, computing system 400 may include circuitry or other specialized hardware for carrying out some or all aspects of the processes. In some operational settings, computing system 400 may be configured as a system that includes one or more units, each of which is configured to carry out some aspects of the processes either in software, hardware, or some combination thereof.

FIG. 4 depicts computing system 400 with a number of components that may be used to perform any of the processes described herein. The main system 402 includes a motherboard 404 having an I/O section 406, one or more central processing units (CPU) 408, and a memory section 410, which may have a flash memory card 412 related to it. The I/O section 406 can be connected to a display 414, a keyboard and/or other user input (not shown a disk storage unit 416, and a media drive unit 418. The media drive unit 418 can read/write a computer-readable medium 420, which can contain programs 422 and/or data. Computing system 400 can include a web browser. Moreover, it is noted that computing system 400 can be configured to include additional systems in order to fulfill various functionalities. In another example, computing system 400 can be configured as a mobile device and include such systems as may be typically included in a mobile device such as GPS systems, gyroscope, accelerometers, cameras, etc.

Figure 7:
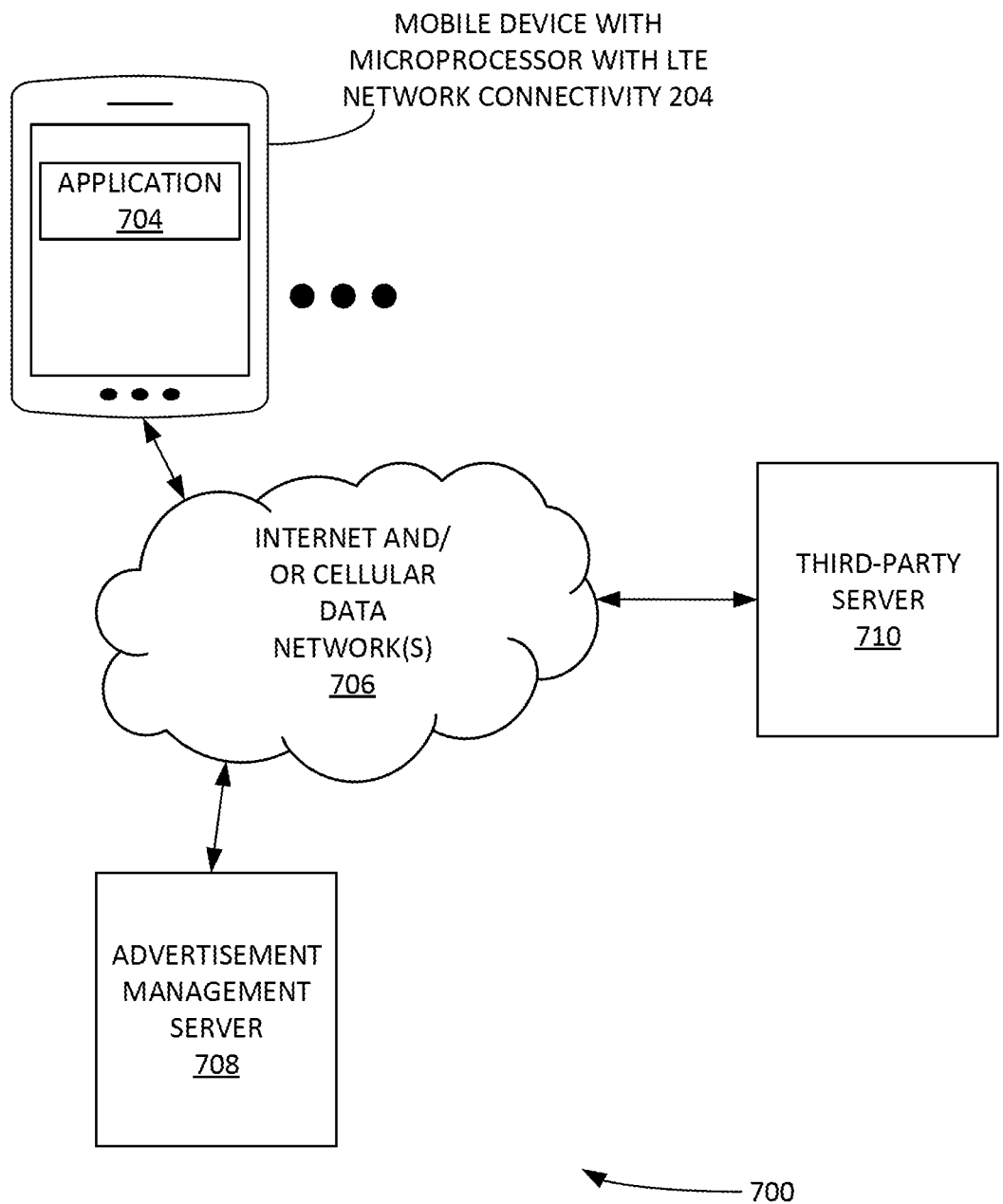
FIG. 7 illustrates an example system for selecting and communication advertisements for display in a vehicle-based mobile projection system, according to some embodiments.

FIG. 7 illustrates an example system 700 for selecting and communication advertisements for display in a vehicle-based mobile projection system, according to some embodiments. Advertisement management server 708 select digital advertisement content (and/or other digital content) for display on Pico projector 206 (and/or other mobile display/projecting system(s) in a vehicle). Advertisement management server 708 can communicate the digital advertisement content to application 704. Application 704 can then communicate the digital advertisement content to a projector 206 (e.g. a Pico projector, etc.) for display. Application 704 can queue digital advertisement content for display.

Application 704 can communicate its location to advertisement management server 708. Application 704 can communicate user information to advertisement management server 708. Application 704 can communicate digital advertisement content display history to advertisement management server 708. Application 704 can accept e-payments and/or other electronic compensation for the user. Application 704 can communicate vehicle window dimensions, active display windows, screen type, vehicle ambient lighting, vehicle passenger state, etc. to advertisement management server 708.

Advertisement management server 708 can determine which digital advertisements to communicate to application 704 based on various factors, such as, inter alia: vehicle location, predicted vehicle location, time of day, vehicle type, window size, ambient lighting conditions, etc. Advertisement management server 708 can receive digital advertisements from third-party servers. Advertisement management server 708 can render/format the digital advertisements for display on the specific size, screen type and other window-related factors of a specific vehicle. Advertisement management server 708 can implement process 100.

The screen can the screen can be made of various layers. For example, the screen can be made of an anti-glare film layer, a rear-projection film layer, and a protection layer. The anti-glare film layer can have a light transmittance ninety-two percent (92%), a thickness of 0.075 millimeters and a haze of +/−4.5-7%. The screen can include a rear-projection film layer as well. The rear-projection film layer can have high contrast properties, wide viewing angle capability, and eliminate hot-spotting. The rear-projection film layer can be in a 4:3 or 16:9 aspect ratios in some examples. The screen can utilize tiled installation. The screen can include built-in adhesives for installation. The protection layer can be a PVC material. The PVC layer can have the follow qualities, inter alia: thickness: ca. 300 µm; color: grey; etc.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it will be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed is:

1. A mobile projection system; the system comprising:
a hermetically sealed base unit configured to be releasably attached to an automobile;
a microprocessor configured to receive a plurality of projectable images from a remote server over a wireless network; and
a remote server configured to store a plurality of selected images over a period of time; a projection means configured to project a selected image through a translucent lens, and
wherein the base unit further includes a translucent portion to project a selected image onto a screen at least one rear window of an automobile,
wherein the base unit further includes at least one securing mechanism to releasably attached to a portion of the automobile,
wherein the projection means renders and formats the plurality of selected images for display on a specific size and a screen type of the screen and a rear-window size,
wherein the screen comprises an anti-glare film layer, a rear-projection film layer, and a protection layer, and
wherein the anti-glare film layer has a light transmittance of ninety-two percent and a thickness of zero point zero seven five millimeters (0.075 mm).

2. The system of claim 1, wherein the microprocessor is configured to receive a selected image over a wireless network.

3. The system of claim 2, wherein the microprocessor is further configured to transmit a selected image to the projector.

4. The system of claim 1, further including an adjustable projector lens to provide at a standard, wide, and ultra-wide angle projection of the selected image.

5. The system of claim 4, wherein the projector further includes a plurality of light emitting diodes to provide a high definition image.

6. The system of claim 1, wherein the plurality of selected images is configured to selectively rotate based on the GPS location.

7. The system of claim 1, wherein a power further includes an external port within the automobile.

8. The system of claim 1, wherein the rear-projection film layer has a light transmittance of seventy-five percent and a maximum viewing angle of one-hundred and seventy-five degrees.

9. The system of claim 8, wherein the protection layer comprises a Polyvinyl chloride (PVC) layer.

10. The system of claim 9 wherein the PVC layer is 300 µm.

\* \* \* \* \*